Figure 1:
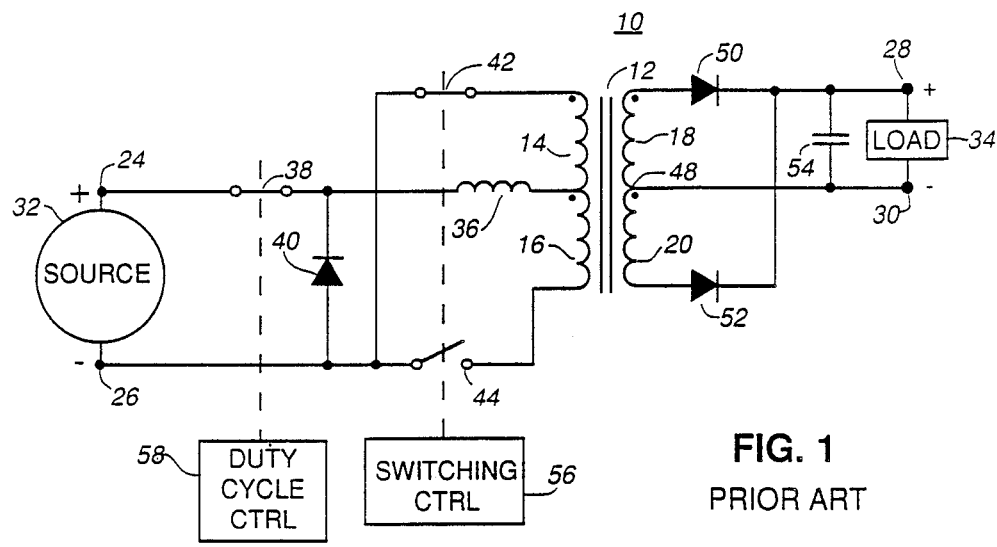

United States Patent [19]

Wells

[11] Patent Number: 4,980,813

[45] Date of Patent: Dec. 25, 1990

[54] CURRENT FED PUSH PULL POWER CONVERTER

[75] Inventor: Mark R. Wells, Kanata, Canada

[73] Assignee: Northern Telecom Limited, Montreal, Canada

[21] Appl. No.: 454,596

[22] Filed: Dec. 21, 1989

[51] Int. Cl.$^5$ .......................................... H02M 7/538
[52] U.S. Cl. .................................... 363/134; 363/24; 363/26; 363/106
[58] Field of Search ................................... 363/24–26, 363/97, 134, 106

[56] References Cited

U.S. PATENT DOCUMENTS

| | | | |
|---|---|---|---|
| 4,025,863 | 5/1977 | Higuchi et al. | 363/25 |
| 4,034,280 | 7/1977 | Cronin et al. | 363/97 |
| 4,736,284 | 4/1988 | Yamagishi et al. | 363/24 |

FOREIGN PATENT DOCUMENTS

| | | | |
|---|---|---|---|
| 2501527 | 7/1976 | Fed. Rep. of Germany | 363/25 |
| 614507 | 7/1978 | U.S.S.R. | 363/134 |

*Primary Examiner*—William H. Beha, Jr.
*Attorney, Agent, or Firm*—R. John Haley; Dallas F. Smith

[57] ABSTRACT

A power converter is provided with a split primary current fed push pull topology. An inductor connects the primary windings. Controllable switches provide alternate circuits from the dc source inputs through each of the primary windings and the inductor. Clamping diodes connect the ends of the inductor to the dc source inputs opposite to those provided by the controllable switches. The clamping makes cross conduction unnecessary. Separate duty cycle control is provided in each primary circuit.

15 Claims, 3 Drawing Sheets

CURRENT FED PUSH PULL POWER CONVERTER

This invention relates to current fed push pull power converters and is particularly concerned with converters having split primary windings.

In a conventional push pull converter, the dc power source is applied to the center tapped primary via an inductor. Such an arrangement with controllable switches connecting the primary windings to the power source must either be operated with overlapping duty cycles or be provided with a large snubber network. Overlapping duty cycles or cross conduction intervals are used to avoid a high voltage spike from developing across the opening switch due to the energy stored in the inductor. Large snubber networks are also used to dissipate the stored energy. Both of these solutions may result in lowered efficiency.

An object of the present invention is to provide an improved current fed push pull power converter.

In accordance with an aspect of the present invention there is provided a power converter comprising a transformer having first and second primary windings and a secondary winding, an inductor connected between the first and second windings, first and second controllable switches connected between a first dc source input and the first winding and a second dc source input and the inductor, respectively, for selectively establishing a circuit through the first winding and the inductor, third and fourth controllable switches connected between the second dc source input and the second winding and the first dc source input and the inductor, respectively, for selectively establishing a circuit through the second winding and the inductor, first and second clamping diodes connected between the first dc source input and a junction between the inductor and the second winding, and the second dc source input and a junction between the first winding and the inductor, respectively, first control means for alternately operating the first and third controllable switches; and second control means for operating the second and fourth controllable switches to control the duty cycle of the converter.

In an embodiment of the present invention the first control means comprises a signal generator providing first and second out of phase signals. Preferably, the signals comprise uniform width pulses and the first and second signals are 180 degrees out of phase.

In another embodiment of the present invention the second control means comprises a pulse width modulator.

Conveniently, the controllable switches may be electrically controllable switches, for example, relays or electronic switches, for example, bipolar transistors, field effect transistors, and thyristors.

In accordance with another aspect of the present invention there is provided a power converter comprising a transformer having first and second primary windings and a secondary winding, an inductor connected between the first and second windings, first controllable switch means including first and second controllable switches connected between a first dc source input and the first winding and a second dc source input and the inductor, respectively, for selectively establishing a circuit through the first winding and the inductor, second controllable switch means including third and fourth controllable switches connected between the second dc source input and the second winding and the first dc source input and the inductor, respectively, for selectively establishing a circuit through the second winding and the inductor, first and second clamping diodes connected between the first dc source input and a junction between the inductor and the second winding, and the second dc source input and a junction between the first winding and the inductor, respectively, first control means for alternately operating the first and third controllable switches, and second control means for operating the second and fourth controllable switches to control the duty cycle of the converter.

In accordance with a further aspect of the present invention there is provided a power converter comprising a transformer having first and second primary windings each having first and second ends and a secondary winding, an inductor connected between second ends of the first and second windings, first and second dc source inputs, first and second controllable switch means for selectively connecting one of the primary windings and the inductor to the dc source inputs, first and second clamping diodes connected between the first dc source input and the second end of the second winding, and the second dc source input and the second end of the first winding, respectively.

Figure 2:
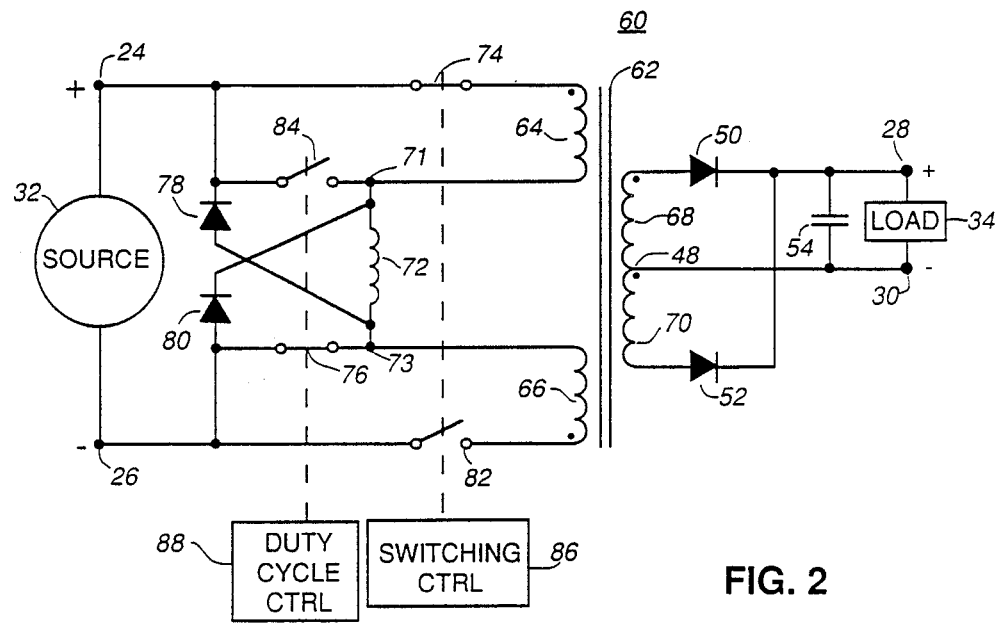
Figure 3:
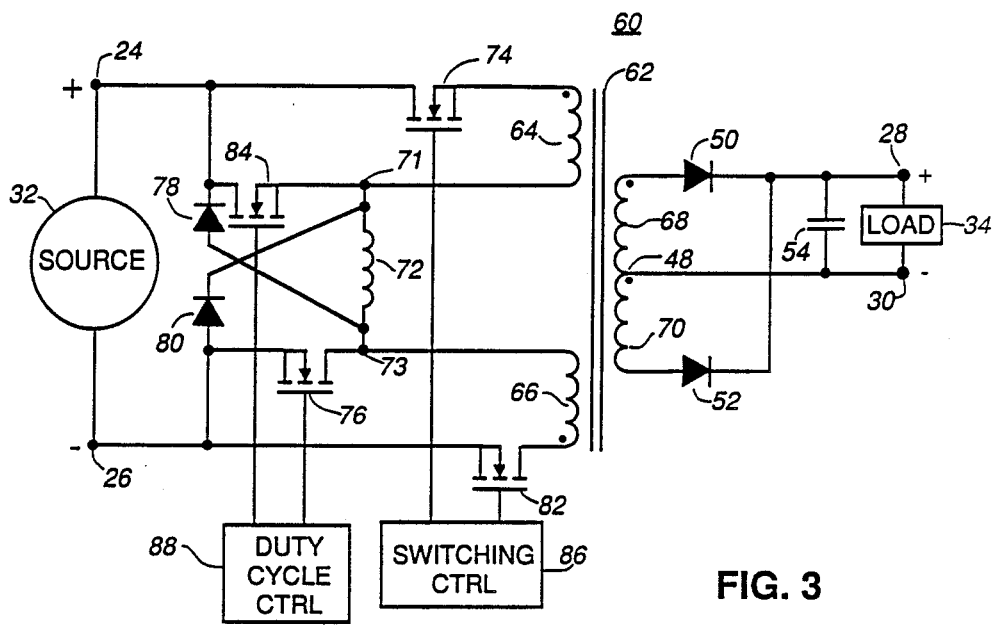
Figure 4:
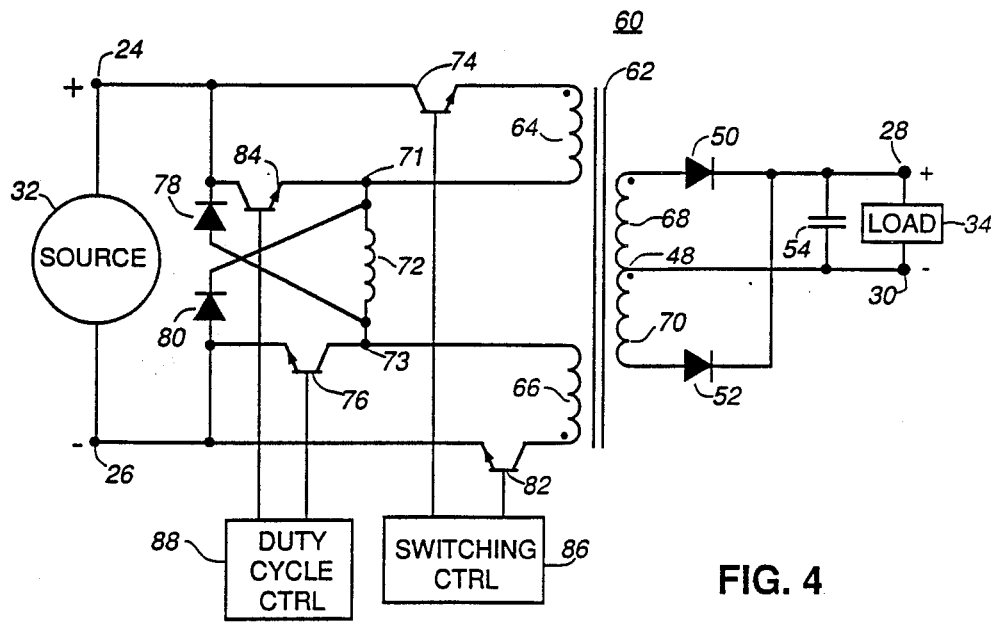
Figure 5:
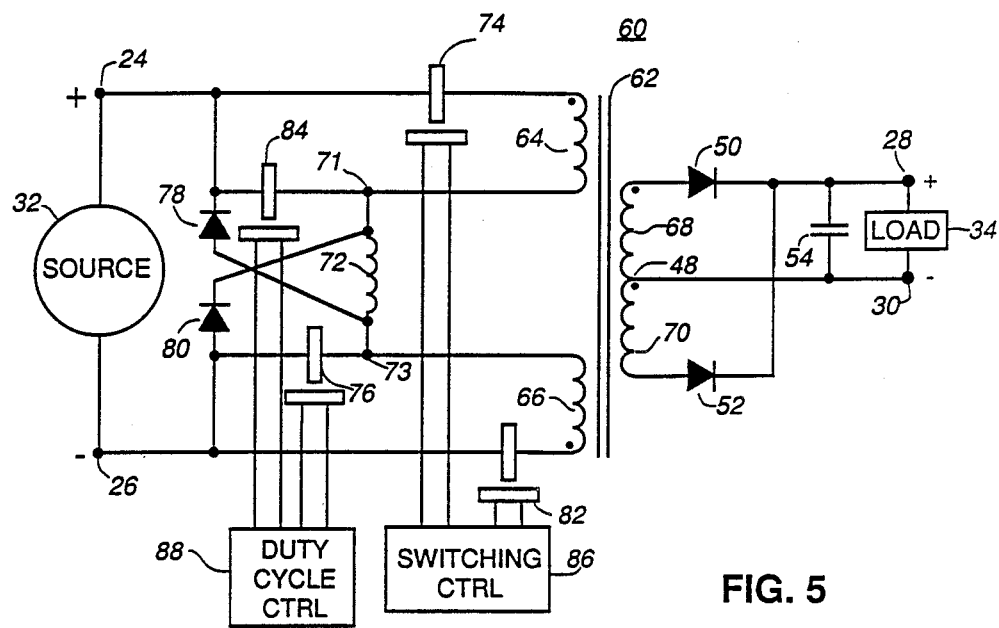

The present invention will be further understood from the following description with reference to the drawings in which:

FIG. 1 schematically illustrates a conventional current fed push pull switching power converter; and FIG. 2 schematically illustrates a current fed push pull switching power converter in accordance with an embodiment of the present invention;

FIG. 3 schematically illustrates the power converter at FIG. 2, in which the controllable switches comprise field effect transistors;

FIG. 4 schematically illustrates the power converter of FIG. 2, in which the controllable switches comprise bipolar transistors; and FIG. 5 schematically illustrates the power converter of FIG. 2, in which the controllable switches comprise relays.

Similar references are used in different figures to denote similar components.

Referring to FIG. 1, there is illustrated a conventional current fed push pull switching power converter 10. The converter 10 includes a transformer 12 having center tapped primary windings 14 and 16 and center tapped secondary windings 18 and 20. The converter 10 also has dc source inputs 24 and 26 and dc outputs 28 and 30. For convenience, the inputs 24 and 26 are shown connected to a dc source 32 and the outputs 28 and 30 are shown connected to a load 34. An inductor 36 connects the center tapped primary windings 14 and 16 to a controllable switch 38, shown closed, which is connected to input 24. A clamping diode 40 connects the input terminal 26 to the inductor 36 and the controllable switch 38, having its anode connected to the input 26. A second controllable switch 42, shown closed, selectively connects the primary windings 14 to the input 26. A third controllable switch 44, shown open, selectively connects the primary windings 16 to the input 26.

The controllable switch 38 is controlled by a duty cycle control 58 and controllable switches 42 and 44 are controlled by a switching control 56.

The secondary windings 18 and 20 include a center tap 48. The winding 18 is connected to the dc output 28 via a rectifier diode 50 and the winding 20 is connected to the dc output 28 via a rectifier diode 52. The dc output 30 is connected to the center tap 48. A filter capacitor 54 is provided across the outputs 28 and 30.

In operation, a power cycle is initiated by the switching control 56 and the duty cycle control 58 closing the controllable switches 42 and 38, respectively, as shown in FIG. 1. The dc source 32 is applied to the primary winding 14 via the inductor 36, resulting in an increasing current flow. At some time within the first half of the power cycle, the duty cycle control 58 opens the controllable switch 38, thereby removing the dc source 32 from the primary circuit and resulting in a decreasing current. The current in the inductor 36 and the primary winding 14 is then shunted by the clamping diode 40. At approximately one-half of the power cycle period, the switching control 56 closes the controllable switch 44, thereby applying the dc source 32 to the primary winding 16. The switching control 56 subsequently opens the controllable switch 42 to provide an overlap in conduction to prevent the development of a high voltage spike at the controllable switch 42. The time period for cross-conduction depends upon propagation and time delays the switching circuit. The remainder of the power cycle is as described above but with the primary winding 16 and the controllable switch 44 carrying the current. This converter shares the controllable switch 38 for duty cycle control and the clamping diode 40 between both primary circuits.

The varying current flowing in primary windings 14 and 16, induces current in the secondary windings 18 and 20, respectively. During the first half of the cycle, in which the current increases and then decreases in the primary winding 14, a current is induced in the secondary winding 18 and is permitted to flow by the rectifier diode 50, a similar current in the secondary winding 20 is blocked by the rectifier diode 52. The current, smoothed by the filter capacitor 54, is supplied to the load 34 via outputs 28 and 30. Similarly, during the second half of the cycle in which the current flows in the primary winding 16, a current is induced in the secondary winding 20 and permitted to flow by the rectifier diode 52, a similar current in the secondary winding 18 is blocked by the rectifier diode 50. The current, smoothed by the filter capacitor 54, is supplied to the load 34 via outputs 28 and 30.

Referring to FIG. 2, there is illustrated a current fed push pull switching power converter 60 in accordance with an embodiment of the present invention. The converter 60 includes a transformer 62 having split primary windings 64 and 66 and center tapped secondary windings 68 and 70. The converter 60 also has dc supply inputs 24 and 26 and dc outputs 28 and 30. For convenience, the inputs 24 and 26 are shown connected to a dc source 32 and the outputs 28 and 30 are shown connected to a load 34. The primary windings 64 and 66 are connected together by an inductor 72 at junction points 71 and 73, respectively. A first controllable switch 74, shown closed, connects the input 24 to the primary winding 64. A second controllable switch 76, shown closed, connects the inductor 72 at the junction point 73 to the input 26. A clamping diode 78 connects the input 24 to the inductor 72 at the junction point 73, having the input 24 connected to its cathode. A second clamping diode 80 connects the input 26 to the inductor 72 at the junction point 71, having the input 26 connected to its anode. A third controllable switch 82, shown open, connects the input 26 to the primary winding 66. And a fourth controllable switch 84 connects the dc input 24 to the inductor 72 at the junction point 71. The first and third controllable switches, that is 74 and 82 respectively, are controlled by a switching control 86 and the second and fourth controllable switches, that is 76 and 84 respectively, are controlled by a duty cycle control 88.

The secondary windings 68 and 70 include a center tap 48. The winding 68 is connected to the dc output 28 via a rectifier diode 50 and the winding 70 is connected to the dc output 28 via a rectifier diode 52. The dc output 30 is connected to the center tap 48. A filter capacitor 54 is provided across the outputs 28 and 30.

In operation, a power cycle is initiated by the switching control 86 and the duty cycle control 88 closing the controllable switches 74 and 76, respectively, as shown in FIG. 2. This applies the dc source 32 to the primary winding 64 and the inductor 72, resulting in an increasing current flow. At some time within the first half of the power cycle period, the duty cycle control 88 opens the controllable switch 76, thereby removing the dc source 32 from the primary circuit. The clamping diode 78 conducts the decreasing current flow from the primary winding 64 and the inductor 72 to the controllable switch 74. At approximately one-half of the power cycle period, the switching control 86 opens the controllable switch 74. The current remaining in the inductor 72 is then diverted by diodes 78 and 80 to the dc source 32. This condition remains for only a short period of time before the second half of the power cycle is initiated by the switching control 86 and the duty cycle control 88 closing the controllable switches 82 and 84, respectively, shown open in FIG. 2. The dc source 32 is applied to the primary winding 66 and the inductor 2, resulting in an increasing current flow. At some time within the second half of the power cycle period, the duty cycle control 88 opens the controllable switch 84, thereby removing the dc source 32 from the primary circuit. The clamping diode 80 conducts the decreasing current flow from the primary winding 66 and the inductor 72 to the controllable switch 82. At approximately one-half of the power cycle period, the switching control 86 opens the controllable switch 82. The current remaining in the inductor 72 is then diverted by diodes 78 and 80 to the dc source 32. This condition remains for only a short period of time until the power cycle repeats as described above.

In FIGS. 3, 4, and 5, the controllable switches 74, 76, 82, and 84 comprise field effect transistors, bipolar transistors and relays, respectively.

The varying current flowing in primary windings 64 and 66, induces current in the secondary windings 68 and 70 which is rectified and smoothed in conventional manner as described above with respect to FIG. 1.

The converter described above has a number of advantages over the conventional converter. By splitting the primary and diverting the current through the inductor 72 it is possible to have the controllable switches 74 and 82 operating alternately at a nearly 50% duty cycle, without requiring a period of cross conduction.

Another advantage is in having duty cycle control switches 76 and 84 in each of the primary circuits, thus reducing by one-half the frequency of operation and the power dissipation compared with that of the conventional converter. While the total power dissipation in the duty cycle control function remains approximately constant, the dissipation is split between the two switches 76 and 84, thereby reducing the thermal stress in each of the devices.

A further advantage is in having clamping diodes 78 and 80 in each of the primary circuits, thus reducing the rms current carried by each of the clamping diodes.

In addition to using standard pulse with modulation techniques, it is also possible to use resonant switching techniques to control both the duty cycle control switches 76 and 89 and switching control switches 74 and 82.

Numerous modifications, variations and adaptations may be made to the particular embodiments of the invention described above without departing from the scope of the invention, which is defined in the claims.

What is claimed is:

1. A power converter, comprising:
   a transformer having first and second primary windings and a secondary winding;
   an inductor connected between the first and second windings;
   first and second controllable switches connected between a first dc source input and the first winding and a second dc source input and the inductor, respectively, for selectively establishing a circuit through the first winding and the inductor;
   third and fourth controllable switches connected between the second dc source input and the second winding and the first dc source input and the inductor, respectively, for selectively establishing a circuit through the second winding and the inductor;
   first and second clamping diodes connected between the first dc source input and a junction between the inductor and the second winding, and the second dc source input and a junction between the first winding and the inductor, respectively;
   first control means for alternately operating the first and third controllable switches; and
   second control means for operating the second and fourth controllable switches to control the duty cycle of the converter.

2. A power converter as claimed in claim I wherein the first control means comprises a signal generator providing first and second out of phase signals.

3. A power converter as claimed in claim 2 wherein the signals comprise uniform width pulses and the first and second signals are 180 degrees out of phase.

4. A power converter as claimed in claim 3 wherein the second control means comprises a pulse width modulator.

5. A power converter as claimed in claim 4 wherein the controllable switches comprise bipolar transistors.

6. A power converter as claimed in claim 4 wherein the controllable switches comprise field effect transistors.

7. A power converter as claimed in claim 4 wherein the controllable switches comprise relays.

8. A power converter, comprising:
   a transformer having first and second primary windings and a secondary winding;
   an inductor connected between the first and second windings;
   first controllable switch means including first and second controllable switches connected between a first dc source input and the first winding and a second dc source input and the inductor, respectively, for selectively establishing a circuit through the first winding and the inductor;
   second controllable switch means including third and fourth controllable switches connected between the second dc source input and the second winding and the first dc source input and the inductor, respectively, for selectively establishing a circuit through the second winding and the inductor;
   first and second clamping diodes connected between the first dc source input and a junction between the inductor and the second winding, and the second dc source input and a junction between the first winding and the inductor, respectively;
   first control means for alternately operating the first and third controllable switches; and
   second control means for operating the second and fourth controllable switches to control the duty cycle of the converter.

9. A power converter as claimed in claim 8 wherein the first control means comprises a signal generator providing first and second out of phase signals.

10. A power converter as claimed in claim 9 wherein the signals comprise uniform width pulses and the first and second signals are 180 degrees out of phase.

11. A power converter as claimed in claim 10 wherein the second control means comprises a pulse width modulator.

12. A power converter as claimed in claim 11 wherein the controllable switches comprise bipolar transistors.

13. A power converter as claimed in claim 11 wherein the controllable switches comprise field effect transistors.

14. A power converter as claimed in claim 11 wherein the controllable switches comprise relays.

15. A power converter, comprising:
   a transformer having first and second primary windings each having first and second ends and a secondary winding;
   an inductor connected between second ends of the first and second windings;
   first and second dc source inputs;
   first and second controllable switch means for selectively connecting one of the primary windings and the inductor to the dc source inputs; and
   first and second clamping diodes connected between the first dc source input and the second end of the second winding, and the second dc source input and the second end of the first winding, respectively.

* * * * *